(12) United States Patent
Hatano et al.

(10) Patent No.: US 11,298,970 B2
(45) Date of Patent: Apr. 12, 2022

(54) DECORATIVE MOLDED ARTICLE, METHOD OF MANUFACTURING DECORATIVE MOLDED ARTICLE, TRANSFER SHEET, AND DISPLAY DEVICE

(71) Applicant: Dai Nippon Printing Co., Ltd., Tokyo (JP)

(72) Inventors: Masahiro Hatano, Kashiwa (JP); Takayuki Shimada, Saitama (JP); Kentaro Akiyama, Moriya (JP); Kazuki Takizawa, Asaka (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 297 days.

(21) Appl. No.: 16/625,539

(22) PCT Filed: Jun. 6, 2018

(86) PCT No.: PCT/JP2018/021740
§ 371 (c)(1),
(2) Date: Dec. 20, 2019

(87) PCT Pub. No.: WO2019/003842
PCT Pub. Date: Jan. 3, 2019

(65) Prior Publication Data
US 2021/0402825 A1 Dec. 30, 2021

(30) Foreign Application Priority Data
Jun. 28, 2017 (JP) .............................. JP2017-126451

(51) Int. Cl.
*B32B 3/00* (2006.01)
*B44C 1/17* (2006.01)
(Continued)

(52) U.S. Cl.
CPC .............. *B44C 1/1708* (2013.01); *B32B 3/30* (2013.01); *B32B 7/12* (2013.01); *B32B 37/26* (2013.01);
(Continued)

(58) Field of Classification Search
CPC .............. B32B 3/30; B32B 7/12; B32B 37/26
See application file for complete search history.

(56) References Cited

U.S. PATENT DOCUMENTS
2002/0150722 A1 10/2002 Suzuki
2004/0150874 A1 8/2004 Suzuki
(Continued)

FOREIGN PATENT DOCUMENTS
JP 2000-338310 A 12/2000
JP 2008-040064 A 2/2008
(Continued)

OTHER PUBLICATIONS

International Search Report dated Aug. 28, 2018, issued for PCT/JP2018/021740.

*Primary Examiner* — Elizabeth E Mulvaney
(74) *Attorney, Agent, or Firm* — Locke Lord LLP

(57) ABSTRACT

Provided are a decorative molded article that prevents sparkle and has a high contrast, a method for producing the decorative molded article, and a transfer sheet for use for the decorative molded article. The decorative molded article 10 is provided with a protective layer 2 having unevenness on a resin molded article 1, wherein in the surface of the protective layer 2, the arithmetic average roughness ($Ra_{x1}$) according to JIS B0601:1994 at a cutoff value of 0.8 mm, the arithmetic average roughness ($Ra_{y1}$) according to JIS B0601:1994 at a cutoff value of 0.08 mm, and the ten-point average roughness ($Rz_{x1}$) according to JIS B0601:1994 at a cutoff value of 0.8 mm satisfy the following requirements (Continued)

(1) to (3): $0.30 \leq (Ra_{x1} - Ra_{y1})/Ra_{y1} \leq 0.85$ (1), $Rz_{x1}/Ra_{x1} \leq 15.0$ (2), $Ra_{x1} \geq 0.14$ μm (3).

6 Claims, 3 Drawing Sheets

(51) Int. Cl.
  *B32B 3/30* (2006.01)
  *B32B 7/12* (2006.01)
  *B32B 37/26* (2006.01)
(52) U.S. Cl.
  CPC ... *B32B 2037/268* (2013.01); *B32B 2307/538* (2013.01); *B32B 2457/20* (2013.01)

(56) References Cited

U.S. PATENT DOCUMENTS

| | | |
|---|---|---|
| 2006/0159902 A1 | 7/2006 | Suzuki |
| 2007/0253064 A1 | 11/2007 | Ookubo et al. |
| 2009/0262429 A1 | 10/2009 | Ookubo et al. |
| 2018/0136510 A1 | 5/2018 | Onishi et al. |
| 2021/0323264 A1* | 10/2021 | Hatano ................. B29C 45/14 |

FOREIGN PATENT DOCUMENTS

| | | |
|---|---|---|
| JP | 5095598 B2 | 12/2012 |
| JP | 2016-068344 A | 5/2016 |
| JP | 2016-088094 A | 5/2016 |
| JP | 2016-097510 A | 5/2016 |
| WO | 2016/194990 A1 | 12/2016 |

* cited by examiner

[Fig. 1]
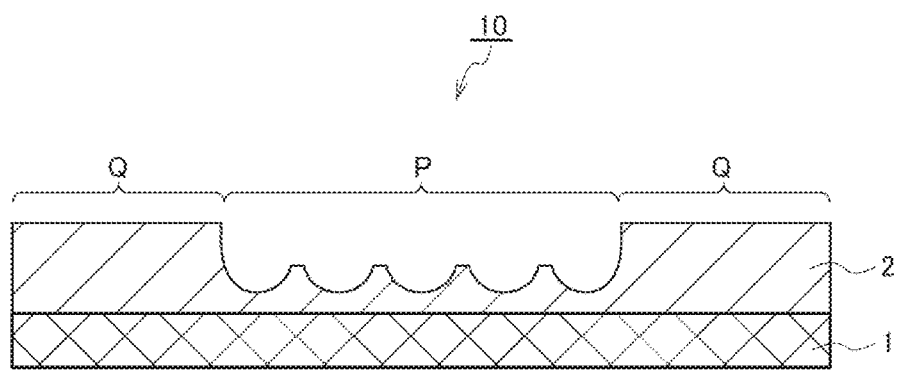
[Fig. 2]
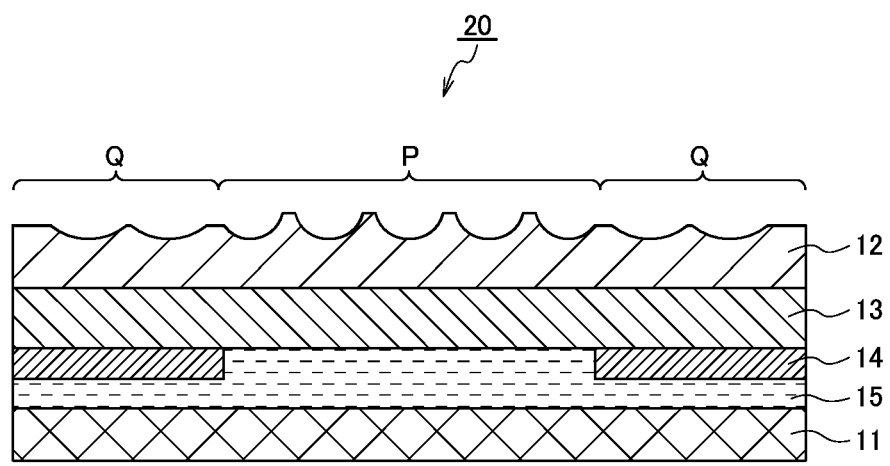

[Fig. 3]
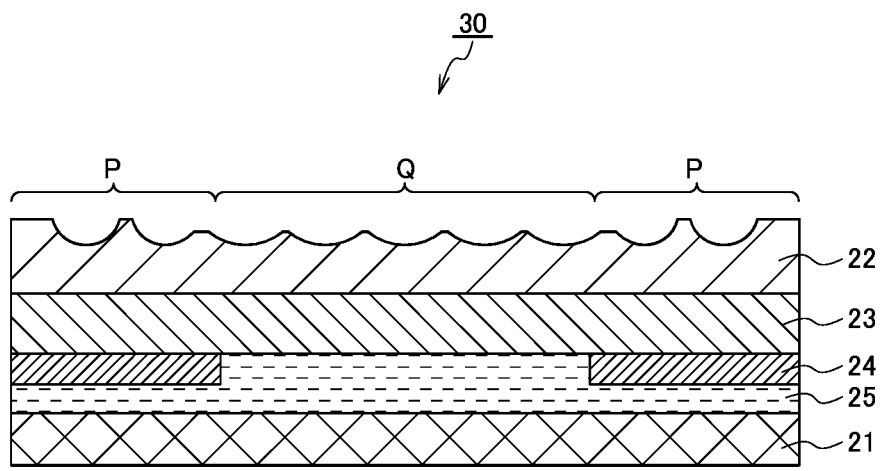
[Fig. 4]
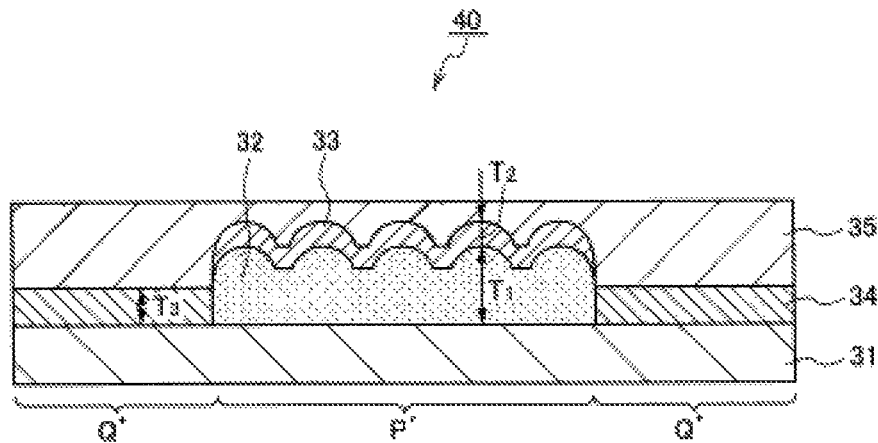

[Fig. 5]
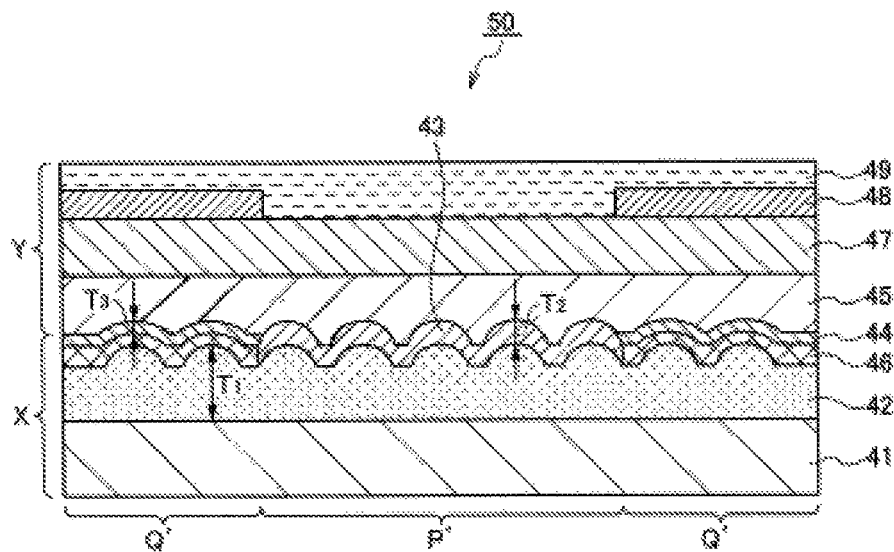
[Fig. 6]
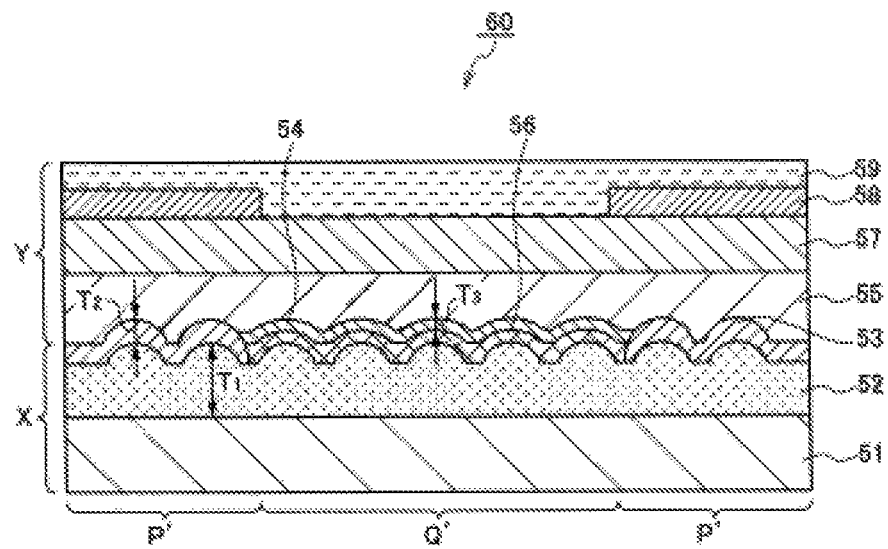

DECORATIVE MOLDED ARTICLE, METHOD OF MANUFACTURING DECORATIVE MOLDED ARTICLE, TRANSFER SHEET, AND DISPLAY DEVICE

TECHNICAL FIELD

The present invention relates to a decorative molded article, a method for producing a decorative molded article, a transfer sheet and a display device.

BACKGROUND ART

Heretofore, in the field of household appliances, car interior parts and sundry articles, high-level functionality and design decorativeness have been expressed by decorating the surface of an object to be transferred with letters or patterns.

One method of decorating an object to be transferred is a transfer method. A transfer method is a method using a transfer sheet prepared by forming a transfer layer including a release layer, a pattern layer and an adhesive layer on a substrate, in which the transfer layer is airtightly adhered to an object to be transferred by pressure under heat and then the substrate is peeled to thereby transfer the transfer layer alone on the surface of the object to be transferred for decorating the surface of the object.

Depending on use in some cases, a surface of an object to be transferred is required to have excellent design decorativeness having different textures such as glossy texture and matted texture as combined.

For example, PTL 1 discloses a partially-matted transfer-molded article produced by keeping a partially-matted transfer sheet that has, as formed on a substrate sheet, a release layer entirely containing a matting agent, a mask layer partially containing an active energy-curable resin, and as a transfer layer, a release layer and a pattern layer, in airtight contact with a surface of an object to be transferred with the transfer layer side thereof kept facing the object, then adhering the transfer layer to the surface of the object to be transferred by applying heat and pressure thereto from the substrate sheet side of the partially-matted transfer sheet, and thereafter releasing the substrate sheet, the release layer and the mask layer.

CITATION LIST

Patent Literature

PTL 1: Japanese Patent 5095598

SUMMARY OF INVENTION

Technical Problem

However, in the partially-matted transfer-molded article described in PTL 1, the matted part of the transfer layer surface after transfer may sparkle, and the letters on the transferred object may be whitish and the contrast thereof may therefore lower.

"Sparkle" means a phenomenon of fine brightness fluctuation to occur in projected images owing to uneven surface structures.

The present invention has been made in consideration of such situations, and its object is to provide a decorative molded article that prevents sparkle, has a high contrast and is excellent in antiglare performance and design decorativeness, a method for producing the decorative molded article, a transfer sheet for use for the decorative molded article, and a display device using the decorative molded article.

Solution to Problem

The present inventors have made assiduous studies for the purpose of solving the above-mentioned problems and, as a result, have found that, in the surface of a region (P) of a protective layer, when the arithmetic average roughness ($Ra_{x1}$) according to JIS B0601:1994 at a cutoff value of 0.8 mm, the arithmetic average roughness ($Ra_{y1}$) according to JIS B0601:1994 at a cutoff value of 0.08 mm, and the ten-point average roughness ($Rz_{x1}$) according to JIS B0601:1994 at a cutoff value of 0.8 mm satisfy predetermined requirements, the above-mentioned problems can be solved.

The present invention has been completed on the basis of such findings.

Specifically, the present invention provides the following [1] to [6].

[1] A decorative molded article provided with a protective layer on a resin molded article, wherein the protective layer has a region (P) having unevenness, and a region (Q) adjacent to the region (P), in the surface of the region (P) of the protective layer, the arithmetic average roughness ($Ra_{x1}$) according to JIS B0601:1994 at a cutoff value of 0.8 mm, the arithmetic average roughness ($Ra_{y1}$) according to JIS B0601:1994 at a cutoff value of 0.08 mm, and the ten-point average roughness ($Rz_{x1}$) according to JIS B0601:1994 at a cutoff value of 0.8 mm satisfy the following requirements (1) to (3):

$$0.30 \leq (Ra_{x1} - Ra_{y1})/Ra_{y1} \leq 0.85 \quad (1)$$

$$Rz_{x1}/Ra_{x1} \leq 15.0 \quad (2)$$

$$Ra_{x1} \geq 0.14 \ \mu m \quad (3)$$

[2] The decorative molded article according to [1], wherein in the surface of the region (Q) of the protective layer, the arithmetic average roughness ($Ra_{x2}$) according to JIS B0601:1994 at a cutoff value of 0.8 mm satisfies the following requirement (4):

$$Ra_{x2} < Ra_{x1} \quad (4)$$

[3] A transfer sheet having a substrate having a region (P') and a region (Q') adjacent to the region (P'), an uneven layer having an uneven profile provided on the region (P') of the substrate, a first release layer formed on the uneven profile of the uneven layer, a second release layer provided on the region (Q') of the substrate, and a protective layer formed on the first release layer and the second release layer, wherein in the surface of the first release layer, the arithmetic average roughness ($Ra_{x11}$) according to JIS B0601:1994 at a cutoff value of 0.8 mm, the arithmetic average roughness ($Ra_{y11}$) according to JIS B0601:1994 at a cutoff value of 0.08 mm, and the ten-point average roughness ($Rz_{x11}$) according to JIS B0601:1994 at a cutoff value of 0.8 mm satisfy the following requirements (1)' to (3)':

$$0.30 \leq (Ra_{x11} - Ra_{y11})/Ra_{y11} \leq 0.85 \quad (1)'$$

$$Rz_{x11}/Ra_{x11} \leq 15.0 \quad (2)'$$

$$Ra_{x11} \geq 0.14 \ \mu m \quad (3)'$$

[4] The transfer sheet according to [3], wherein in the surface of the second release layer, the arithmetic average roughness ($Ra_{x22}$) according to JIS B0601:1994 at a cutoff value of 0.8 mm satisfies the following requirement (4)':

$$Ra_{x22} < Ra_{x11} \quad (4)'$$

[5] A method for producing a decorative molded article, including a step of transferring the protective layer of the transfer sheet of [3] or [4] onto a resin molded article, and a step of releasing the first release layer and the second release layer of the transfer sheet.

[6] A display device having a decorative molded article of [1] or [2] on the front surface of a display element.

Advantageous Effects of Invention

According to the present invention, there can be provided a decorative molded article that prevents sparkle, has a high contrast and is excellent in antiglare performance and design decorativeness, a method for producing the decorative molded article, a transfer sheet for use for the decorative molded article, and a display device using the decorative molded article.

BRIEF DESCRIPTION OF DRAWINGS

FIG. 1 is a cross-sectional view showing one embodiment of a decorative molded article of the present invention.

FIG. 2 is a cross-sectional view showing one embodiment of a decorative molded article of the present invention.

FIG. 3 is a cross-sectional view showing one embodiment of a decorative molded article of the present invention.

FIG. 4 is a cross-sectional view showing one embodiment of a transfer sheet of the present invention.

FIG. 5 is a cross-sectional view showing one embodiment of a transfer sheet of the present invention.

FIG. 6 is a cross-sectional view showing one embodiment of a transfer sheet of the present invention.

DESCRIPTION OF EMBODIMENTS

[Decorative Molded Article]

The decorative molded article of the present invention is provided with a protective layer on a resin molded article, wherein the protective layer has a region (P) having unevenness, and a region (Q) adjacent to the region (P). With that, the decorative molded article of the present invention is such that, in the surface of the region (P) thereof, the arithmetic average roughness ($Ra_{x1}$) according to JIS B0601:1994 at a cutoff value of 0.8 mm, the arithmetic average roughness ($Ra_{y1}$) according to JIS B0601:1994 at a cutoff value of 0.08 mm, and the ten-point average roughness ($Rz_{x1}$) according to JIS B0601:1994 at a cutoff value of 0.8 mm satisfy specific requirements.

FIG. 1 to FIG. 3 each are a cross-sectional view showing one embodiment of a decorative molded article of the present invention. In the decorative molded article 10 of FIG. 1, a protective layer 2 is provided on a resin molded article 1. The protective layer 2 has a region (P) having unevenness, and a region (Q) adjacent to the region (P).

As shown in FIG. 2, the decorative molded article 20 of the present invention may have an anchor layer 13, a print layer 14 and an adhesive layer 15 as provided between the resin molded article 11 and the protective layer 12.

The position of the region (P) and the region (Q) is not specifically limited, and as shown in FIG. 2, the region (P) may be arranged between the regions (Q) or inside the region (Q); or as shown in FIG. 3, the region (Q) may be arranged between the regions (P) or inside the region (P). The region (Q) may be smooth, not having an uneven part, or may have an uneven part like the region (P).

Hereinunder, the layers constituting the decorative molded article of the present invention are descried specifically.

(Protective Layer)

The protective layer in the decorative molded article of the present invention is such that, in the region (P), the arithmetic average roughness ($Ra_{x1}$) according to JIS B0601:1994 at a cutoff value of 0.8 mm, the arithmetic average roughness ($Ra_{y1}$) according to JIS B0601:1994 at a cutoff value of 0.08 mm, and the ten-point average roughness ($Rz_{x1}$) according to JIS B0601:1994 at a cutoff value of 0.8 mm satisfy the following requirements (1) to (3):

$$0.30 \leq (Ra_{x1} - Ra_{y1})/Ra_{y1} \leq 0.85 \quad (1)$$

$$Rz_{x1}/Ra_{x1} \leq 15.0 \quad (2)$$

$$Ra_{x1} \geq 0.14 \ \mu m \quad (3)$$

Here, the cutoff value is a value indicating a degree of cutting a low-frequency component from a profile curve composed of a high-frequency component (roughness component) and a low-frequency component (waviness component). Accordingly, in the case where the cutoff value (reference length) is 0.08 mm, the degree of cutting a low-frequency component in a roughness curve is large as compared with that in the case where the cutoff value (reference length) is 0.8 mm. Namely, the value of $Ra_{y1}$ can be considered to be a high-frequency component in the uneven surface of the protective layer, and the value of ($Ra_{x1} - Ra_{y1}$) can be considered to be a low-frequency component in the uneven surface of the protective layer. Accordingly, "($Ra_{x1} - Ra_{y1}$)/$Ra_{y1}$" in the requirement (1) can be considered to be a proportion of the low-frequency component to the high-frequency component in the uneven surface.

In the requirement (1), when ($Ra_{x1} - Ra_{y1}$)/$Ra_{y1}$ is less than 0.30, the low-frequency component in the uneven surface of the protective layer is too small. In addition, in this case, since unevenness rich in a high-frequency component is formed in the surface of the protective layer, light diffusion on the uneven surface may be strengthened to cause whitening and contrast reduction.

In the requirement (1), when ($Ra_{x1} - Ra_{y1}$)/$Ra_{y1}$ is more than 0.85, the low-frequency component is too much in the uneven surface of the protective layer. In this case, the nearly smooth region (Q) and the region (P) could hardly be differentiated to lower design decorativeness.

($Ra_{x1} - Ra_{y1}$)/$Ra_{y1}$ is, from the viewpoint of attaining a balance between whitening prevention and good design decorativeness, preferably 0.30 to 0.82, more preferably 0.30 to 0.78, even more preferably 0.30 to 0.74.

In this description, "AA to BB" means "AA or more and BB or less". The same shall apply hereinunder.

In the requirement (2), when $Rz_{x1}/Ra_{x1}$ is more than 15.0, randomness (fluctuation) in the unevenness of the protective layer is too large. In this case, since the randomness of the unevenness of the surface of the protective layer is too large, the uneven surface may sparkle.

$Rz_{x1}/Ra_{x1}$ is, from the viewpoint of preventing the uneven surface from sparkle, preferably 14.0 or less, more preferably 13.0 or less, even more preferably 12.0 or less.

The lower limit of $Rz_{x1}/Ra_{x1}$ is, from the viewpoint of the ability to impart certain randomness to unevenness of the protective layer and the ability to make the defects of the protective layer hardly noticeable, preferably 5.0 or more, more preferably 6.0 or more, even more preferably 7.0 or more.

In the requirement (3), when $Ra_{x1}$ is less than 0.14 μm, sufficient antiglare performance cannot be attained.

A large $Ra_{x1}$ can secure antiglare performance, but when too large, contrast reduction may occur. From the viewpoint of satisfying both antiglare performance and contrast, $Ra_{x1}$ is preferably 0.14 to 0.22 μm, more preferably 0.15 to 0.21 μm, even more preferably 0.16 to 0.20 μm.

$Rz_{x1}$ is preferably 0.25 to 5.00 μm, more preferably 0.50 to 2.50 μm, even more preferably 1.00 to 2.00 μm.

In the case where $Rz_{x1}$ is 0.25 μm or more, randomness (fluctuation) of unevenness in the region (P) can be secured, and when defects such as flaws have formed in the region (P) in the case, the defects can be made to be inconspicuous and production yield can be thereby increased. When $Rz_1$ is 5.00 μm or less, the design decorativeness of the transferred object can be prevented from lowering. In addition, when $Rz_1$ is 5.00 μm or less and in the case where the transferred object is used in front of the display element of a liquid crystal display device, whitening and sparkle can be prevented.

In the present invention, the surface of the region (Q) of the protective layer may be nearly smooth, not having an uneven part, or may have an uneven part like the region (P).

In the present invention, in the surface of the region (Q) of the protective layer, preferably, the arithmetic average roughness ($Ra_{x2}$) according to JIS B0601:1994 at a cutoff value of 0.8 mm satisfies the following requirement (4):

$$Ra_{x2} < Ra_{x1} \quad (4)$$

When $Ra_{x1}$ and $Ra_{x2}$ satisfy the requirement (4), the region (P) and the region (Q) can be clearly differentiated from each other, and design decorativeness can be thereby improved.

A difference between $Ra_{x1}$ and $Ra_{x2}$ ($Ra_{x1} - Ra_{x2}$) is, from the viewpoint of increasing design decorativeness, preferably 0.05 to 1.00 μm, more preferably 0.07 to 0.80 μm, even more preferably 0.12 to 0.30 μm.

$Ra_{x2}$ is, from the viewpoint of clearly differentiating from the region (P) to improve design decorativeness, preferably less than 0.10 μm, more preferably 0.07 μm or less, even more preferably 0.05 μm or less.

In this description, $Ra_{x1}$, $Ra_{x2}$, $R_{z1}$ and $Ra_{y1}$ each are an average value of data measured in arbitrary 20 sites with neither defects nor abnormalities in sites corresponding to the region (P) and the region (Q) of the protective layer, for which samples cut out of sites not visually having any abnormalities such as dust and flaws are prepared.

$Ra_{x11}$, $Ra_{x22}$, $Rz_{11}$ and $Ra_{y11}$ to be mentioned below each are also an average value of data measured in the same manner.

The protective layer is a layer containing a cured product of a thermosetting resin composition. After a transfer layer has been transferred from a transfer sheet to an object to be transferred, the protective layer plays a role of protecting the resultant decorative molded article from being worn, or protecting it from light or chemicals.

Preferably, the protective layer contains a cured product of a curable resin composition as a main component thereof. The main component means a component that accounts for 50% by mass or more of the total solid content constituting the protective layer, and the proportion is preferably 70% by mass or more, more preferably 80% by mass or more, even more preferably 90% by mass or more.

A cured product of a curable resin composition includes a cured product of a thermosetting resin composition, and a cured product of an ionizing radiation-curable resin composition, and among these, a cured product of an ionizing radiation-curable resin composition is preferred.

The protective layer may contain a thermoplastic resin, but from the viewpoint of improving scratch resistance, the amount thereof is preferably minor. Specifically, the content of a thermoplastic resin in the protective layer is preferably less than 5% by mass, more preferably less than 1% by mass, even more preferably less than 0.1% by mass, further more preferably 0% by mass.

The curable resin composition for the protective layer can be in a semi-cured state at the time of forming a protective layer and, after transferred to an object to be transferred, the curable resin composition may be cured by heating or through irradiation with ionizing radiation in an accelerated manner for complete curing. In that manner, the followability of the transfer sheet to the transferred object can be bettered and moldability can be thereby bettered.

The protective layer may contain particles such as organic particles and inorganic particles. Containing particles, the protective layer can be prevented from emphasizing sparkle or defects owing to expression of internal haze to result from refractive index difference from resin components. For the same purpose, such particles may also be contained in any other functional layer such as an adhesive layer or an anchor layer to be mentioned below. From the viewpoint of preventing cracking in molding, preferably, particles are contained in a functional layer rather than in the protective layer.

The organic particles include particles of polymethyl methacrylate, polyacryl-styrene copolymer, melamine resin, polycarbonate, polystyrene, polyvinyl chloride, benzoguanamine-melamine-formaldehyde condensate, silicone, fluororesin and polyester resin.

The inorganic particles include particles of silica, alumina, antimony, zirconia and titania.

The average particle size of the particles is preferably 0.05 to 5.0 μm, more preferably 0.5 to 3.0 μm.

In this description, the average particle size is a 50% particle size (d50: median diameter), for which particles in a solution are measured according to a dynamic light scattering method and the particle size distribution is expressed as a volume cumulative distribution. For example, the 50% particle size can be measured using a Microtrac particle sizer (available from Nikkiso Co., Ltd.).

The content of particles is, relative to 100 parts by mass of the resin component in the protective layer, preferably 0.1 to 20 parts by mass, more preferably 1 to 10 parts by mass.

When the content of particles is 0.1 parts by mass or more, defects can be hardly emphasized and sparkle can be readily prevented. When the content of particles is 20 parts by mass or less, design decorativeness can be prevented from worsening owing to difficulty in differentiating the region (P) and the region (Q) from each other.

The thickness of the protective layer is, from the viewpoint of the balance between surface hardness and moldability, preferably 0.5 to 30 μm, more preferably 1 to 20 μm, even more preferably 3 to 10 μm.

(Resin Molded Article)

For the resin molded article, preferably used is an injection-moldable thermoplastic resin or thermosetting resin, but other various resins are also usable.

In the case where the decorative molded article of the present invention is produced according to an in-mold process, a thermoplastic resin is preferably used. Such a thermoplastic resin includes a polystyrene resin, a polyolefin resin, an ABS resin (including a heat-resistant ABS resin), an AS resin, an AN resin, a polyphenylene oxide resin, a polycarbonate resin, a polyacetal resin, an acrylic resin, a polyethylene terephthalate resin, a polybutylene terephthalate resin, a polysulfone resin, and a polyphenylene sulfide resin.

The decorative molded article of the present invention may have a functional layer such as an anchor layer, a print layer and an adhesive layer between the resin molded article and the protective layer.

(Anchor Layer)

The anchor layer is a layer optionally arranged for the purpose of improving heat resistance in a case of high-temperature environments such as in an in-mold process, and is formed of a curable resin. The curable resin includes an ionizing radiation-curable resin and a thermosetting resin. As the ionizing radiation-curable resin, usable is a polymer having at least one ionizing radiation-curable functional group selected from the group consisting of a vinyl group, a (meth)acryloyl group, an allyl group and an epoxy group. Examples thereof include acryl (meth)acrylate, urethane (meth)acrylate, polyester (meth)acrylate, epoxy (meth)acrylate and polyether (meth)acrylate. Urethane (meth)acrylate is especially preferred. The thermosetting resin includes a phenol-formaldehyde resin, a urea-formaldehyde resin, a melamine-formaldehyde resin, a resin prepared by curing an acryl polyol with an isocyanate, a resin prepared by curing a polyester polyol with an isocyanate, and a resin prepared by curing an acrylic acid with a melamine.

Preferably, the anchor layer contains a resin prepared by reacting an acryl polyol and an isocyanate. When the anchor layer contains a resin prepared by reacting an acryl polyol and an isocyanate and when the print layer or the adhesive layer contains an acryl polyol, the adhesiveness of the print layer or the adhesive layer can be improved. Owing to the affinity of the resin in the protective layer with the resin prepared by reacting an acryl polyol and an isocyanate, the interlayer adhesiveness of the protective layer, the anchor layer and the print layer or the adhesive layer can be improved.

The anchor layer can be formed by applying an anchor layer-forming coating liquid prepared by dissolving or dispersing a mixture of the above-mentioned resin and necessary additives in a suitable solvent according to a known method of a gravure coating method, a roll coating method, a comma coating method, a gravure printing method, a screen printing method, or a gravure reverse roll coating method, and drying it. In general, the thickness of the anchor layer is preferably within a range of 0.1 to 6 μm, more preferably within a range of 1 to 5 μm.

(Print Layer)

The print layer is a layer for imparting a desired design decorativeness to the decorative molded article, and is optionally arranged in the article. The print layer may have any desired pattern, and examples thereof include grain, pebble, fabric, grey, geometric patterns, and letters. For the print layer, a patterned layer to express any of the above-mentioned patterns and an all solid layer can be formed either singly or as combined, and the all solid layer is used generally as a masking layer, a colored layer, or a colored masking layer.

In general, the print layer is formed by printing on the protective layer or on the anchor layer with a printing ink that contains a resin such as a polyvinyl resin, a polyester resin, an acrylic resin, a polyvinyl acetal resin or a cellulose resin as a binder and contains a pigment or a dye having a desired color as a coloring agent. The printing method may be any known printing method of gravure printing, offset printing, silk screen printing, transfer printing, sublimation transfer printing, or inkjet printing.

The thickness of the print layer is, from the viewpoint of design decorativeness, preferably 0.5 to 40 μm, more preferably 1 to 30 μm.

(Adhesive Layer)

The adhesive layer is a layer formed for airtightly adhering the resin molded article and the other layer such as the protective layer. For the adhesive layer, a heat-sensitive or pressure-sensitive resin suitable to a material of the resin molded article is appropriately used. For example, in the case where the material of the resin molded article is an acrylic resin, an acrylic resin is preferably used for the adhesive layer. In the case where the material of the resin molded article is a polyphenylene oxide-polystyrene resin, a polycarbonate resin or a styrene resin, preferably, an acrylic resin, a polystyrene resin or a polyamide resin having an affinity to those resins is used. In the case where the material of the resin molded article is a polypropylene resin, preferably, a chlorinated polyolefin resin, a chlorinated ethylene-vinyl acetate copolymer resin, a cyclic rubber or a chromane-indene resin is used.

An additive such as a UV absorbent or an IR absorbent may be added to the resin.

As a method for forming the adhesive layer, employable is a coating method such as a gravure coating method or a roll coating method, or a printing method such as a gravure printing method or a screen printing method. In the case where the print layer has sufficient adhesiveness to the resin molded article, the adhesive layer may be omitted.

The thickness of the adhesive layer is, in general, preferably 0.1 to 5 μm.

The functional layer to be arranged between the resin molded article and the protective layer contains a binder resin and particles, and the refractive index $n_1$ of the binder resin preferably differs from the refractive index $n_2$ of the particles.

When particles are contained in the functional layer positioned on the side nearer to the resin molded article side than the protective layer, defects such as cracks can be prevented from forming in molding. In the case where the functional layer is formed of plural layers, preferably, the functional layer on the side nearest to the resin molded article contains particles.

When a transfer layer is transferred to the resin molded article, the functional layer is positioned lower than the protective layer. Consequently, in the configuration containing particles in the functional layer, the internally-diffused light can spread in a broader angle range until it reaches the surface of the protective layer, as compared with the configuration containing particles in the protective layer, and therefore the defects having formed on the surface of the protective layer can be prevented from being emphasized and sparkle can also be prevented. Further, the configuration containing particles in the functional layer is more advantageous in that the above-mentioned effects (invisibilization of defects, sparkle prevention) can be more readily realized even though the content of the particles is small, as compared with the configuration containing particles in the protective layer.

Regarding the ratio of the refractive index $n_1$ of the binder resin to the refractive index $n_2$ of the particles, preferably $n_2/n_1$ is 0.98 or less, or 1.02 or more.

From the viewpoint of enhancing the internal haze (internal diffusion) so as not to make defects and sparkle emphasized, $n_2/n_1$ is more preferably 0.98 or less. $n_2/n_1$ of 0.98 or less is preferred since the amount of particles to be added for attaining the same level of an internal haze (internal diffusion) can be reduced in the case.

$n_2/n_1$ of 0.98 or less or 1.02 or more is also preferred since interference fringes can be prevented from forming in the case.

Embodiments of the kind, the average particle size and the amount of the particles to be added to the functional layer are the same as the embodiments of the kind, the average particle size and the amount of the particles to be added to the protective layer.

Preferably, the decorative molded article has particles in at least a part of the interface between the functional layer positioned on the most resin molded article side (functional layer in contact with the resin molded article) and the resin molded article, and when the refractive index of the binder resin in the functional layer in contact with the resin molded article is represented by $n_1$, the refractive index of the particles is represented by $n_2$ and the refractive index of the resin molded article is represented by $n_3$, preferably these satisfy the following requirement (i) or (ii).

$$n_1 < n_2 < n_3 \quad (i)$$

$$n_3 < n_2 < n_1 \quad (ii)$$

The requirement (i) and the requirement (ii) mean that the refractive index $n_1$ of the binder resin (resin 1) in the functional layer in contact with the resin molded article differs from the refractive index $n_3$ of the resin (resin 3) in the resin molded article. To that effect, in the case where the refractive index of the resin 1 differs from that of the resin 3, in general, interference fringes are formed in a decorative molded article.

However, when the requirement (i) or (ii) is satisfied, an internal haze is formed owing to the refractive index difference between the particles positioned in the interface between the functional layer in contact with a resin molded article and the resin molded article (hereinafter also referred to as "interfacial particles") and the resin 1 and the resin 3 to prevent interference fringes. Further, the formed internal haze can make the defects of a decorative molded article inconspicuous and can therefore increase production yield.

In a decorative molded article satisfying the requirement (i) or (ii), the refractive index $n_2$ of the interfacial particles is more than $n_1$ and less than $n_3$, or more than $n_3$ and less than $n_1$, and therefore, reflection owing to the refractive index difference between the resin 1 and the resin 3 can be prevented and whitening owing to reflection can thereby be prevented.

In the case of satisfying the requirement (i), preferably, $n_2/n_1$ is more than 1.00 and 1.03 or less, and $n_2/n_3$ is 0.97 or more and less than 1.00, more preferably $n_2/n_1$ is 1.01 or more and 1.03 or less, and $n_2/n_3$ is 0.97 or more and 0.99 or less.

In the case of satisfying the requirement (ii), preferably, $n_2/n_1$ is 0.97 or more and less than 1.00, and $n_2/n_3$ is more than 1.00 and 1.03 or less, more preferably $n_2/n_1$ is 0.97 or more and 0.99 or less, and $n_2/n_3$ is 1.01 or more and 0.03 or less.

Regarding the requirement (i) or the requirement (ii), when the above-mentioned preferred requirements are satisfied, well-balanced inhibition of interference fringes and whitening can be bettered more.

Particles can be made to exist in at least a part of the interface between the functional layer in contact with the resin molded article and the resin molded article by (a) previously incorporating particles in the resin molded article and/or by (b) previously incorporating particles in the functional layer in contact with the resin molded article. In the above-mentioned embodiments, particles can be readily made to exist at least in a part of the interface between the resin molded article and the functional layer, and the embodiment (b) in which the amount of the particles to be used can be readily controlled is preferred.

In the case of the above-mentioned embodiments (a) and/or (b), the content of the particles is preferably 0.1 to 20% by mass of the total solid content in the layer containing the particles, more preferably 0.5 to 15% by mass, even more preferably 1 to 10% by mass.

Embodiments of the kind and the average particle size of the interfacial particles are the same as the embodiments of the kind and the average particle size of the particles to be added to the protective layer.

However, in the case of the embodiment (b), the thickness T of the functional layer in contact with the resin molded article and the average particle size D of the particles in the interface preferably satisfy a relation of 1.0<D/T. D/T is more preferably 1.1 or more and 2.0 or less, even more preferably 1.3 or more and 1.7 or less.

The total light transmittance according to JIS K7361-1: 1997 of the region (P) in the decorative molded article of the present invention is preferably 80% or more, more preferably 85% or more, even more preferably 90% or more.

The haze according to JIS K7136:2000 of the region (P) in the decorative molded article of the present invention is preferably 5 to 40%, more preferably 10 to 35%, even more preferably 20 to 30%. In the case where the decorative molded article has a region (P) having an uneven surface and a region (Q) adjacent to the region (P), the haze of the region (Q) is not specifically limited. Namely, the region (Q) may substantially have light shieldability and its haze is therefore undetectable, or may have a predetermined haze.

Varying in relation to the design to be given to the decorative molded article, the ratio of the area $S_2$ of the region (Q) to the area $S_1$ of the region (P) [$S_2/S_1$] is not specifically limited, but from the viewpoint of clarifying the contrast between the region (P) and the region (Q), the ratio preferably satisfies a relation of $0.1 \leq S_2/S_1$. Also from the viewpoint of bettering the anti-glare performance of the decorative molded article, the ratio preferably satisfies a relation of $S_2/S_1 \leq 7.0$.

[Transfer Sheet]

The transfer sheet of the present invention has a substrate having a region (P') and a region (Q') adjacent to the region (P'), an uneven layer having an uneven profile provided on the region (P') of the substrate, a first release layer formed on the uneven profile of the uneven layer, a second release layer provided on the region (Q') of the substrate, and a protective layer formed on the first release layer and the second release layer, wherein:

in the first release layer, the arithmetic average roughness ($Ra_{x11}$) according to JIS B0601:1994 at a cutoff value of 0.8 mm, the arithmetic average roughness ($Ra_{y11}$) according to JIS B0601:1994 at a cutoff value of 0.08 mm, and the ten-point average roughness ($Rz_{x11}$) according to JIS B0601:1994 at a cutoff value of 0.8 mm satisfy the following requirements (1)' to (3)':

$$0.30 \leq (Ra_{x11} - Ra_{y11})/Ra_{y11} \leq 0.85 \quad (1)'$$

$$Rz_{x11}/Ra_{x11} \leq 15.0 \quad (2)'$$

$$Ra_{x11} \geq 0.14 \, \mu m \quad (3)'$$

FIG. 4 to FIG. 6 each are a cross-sectional view showing one embodiment of a transfer sheet of the present invention. The transfer sheet 40 of FIG. 4 has a substrate 31 having a region (P') and a region (Q') adjacent to the region (P'). An uneven layer 32 having an uneven profile is provided on the region (P') of the substrate 31, and a first release layer 33 is provided on the uneven profile of the uneven layer 32. A second release layer 34 is provided on the region (Q') of the substrate 31. Further, a protective layer 35 is provided on the first release layer 33 and the second release layer 34.

As shown in FIG. 5, in the transfer sheet 50 of the present invention, an uneven layer 42 may be formed in the region (Q') of the substrate 41. In this case, a relaxation layer 46 is provided on the uneven layer 42 formed on the region (Q') of the substrate 41, and a second release layer 44 is provided on the relaxation layer 46. Optionally, an anchor layer 47, a print layer 48 and an adhesive layer 49 are provided on the protective layer 45. In that manner, the transfer sheet 50 is composed of a release sheet X having the substrate 41, the uneven layer 42, the first release layer 43, the second release layer 44 and the relaxation layer 46, and a transfer layer Y having the protective layer 45, the anchor layer 47, the print layer 48 and the adhesive layer 49.

The position of the region (P') and the region (Q') is not specifically limited. As shown in FIG. 5, the region (P') may be arranged between the regions (Q') or inside the region (Q'); or as shown in FIG. 6, the region (Q') may be arranged between the regions (P') or inside the region (P').

The layers constituting the transfer sheet of the present invention are described specifically hereinunder.

(Substrate)

The substrate for use in the transfer sheet of the present invention includes a polyolefin resin such as polyethylene and polypropylene, a polyvinyl resin such as polyvinyl chloride, polyvinylidene chloride, polyvinyl alcohol, ethylene-vinyl acetate copolymer and ethylene-vinyl alcohol copolymer, a polyester resin such as polyethylene terephthalate, polyethylene naphthalate and polybutylene terephthalate, an acrylic resin such as polymethyl (meth)acrylate and polyethyl (meth)acrylate, a styrene resin such as polystyrene, and a polyamide resin typified by nylon 6 or nylon 66. The substrate is selected from these depending on the conditions of use. For example, from the viewpoint of emphasizing heat resistance, polyethylene terephthalate or the like is used, and from the viewpoint of emphasizing followability for surface profile such as curved profile of an object to be transferred, nylon or the like is used.

The thickness of the substrate is, from the viewpoint of moldability, profile followability and easy handleability, preferably 12 to 150 µm, more preferably 25 to 100 µm.

The surface of the substrate may be processed for physical treatment such as corona discharge treatment or oxidation treatment or may be coated with an anchor agent or a coating material called a primer, for the purpose of enhancing the adhesiveness thereof to uneven layers and others.

(Uneven Layer)

The uneven layer is a layer having an uneven profile, and is formed on the region (P') of the substrate.

Preferably, the uneven layer contains, as a man component thereof, a resin component such as a thermoplastic resin, a cured product of a thermosetting resin composition, or a cured product of an ionizing radiation-curable resin composition. The main component means 50% by mass or more of the total solid content constituting the uneven layer, and the proportion is preferably 70% by mass or more, more preferably 90% by mass or more.

Among the above-mentioned resin components, a cured product of an ionizing radiation-curable resin composition is preferred, which is excellent in strength and which can impart a correct and accurate profile since the composition can cure instantaneously. From the viewpoint of readily securing the effect of an ionizing radiation-curable resin composition, preferably a cured product of an ionizing radiation-curable resin accounts for 70% by mass or more of all the resin components constituting the uneven layer, more preferably 90% by mass or more, even more preferably 95% by mass or more, further more preferably 100% by mass.

The uneven layer may be formed by applying a coating liquid that contains particles and a binder resin, but from the viewpoint of forming a correct and accurate profile, the layer is preferably formed by printing using a printing plate having a profile complementary to the region (P') and the region (Q'). In the case where the uneven layer has any other region, preferably, the plate has a profile complementary to the other region. In the case where the release sheet has any other layer such as a release layer on the uneven layer, a plate may be made to have such a profile that relaxation of the unevenness of the layer owing to the other layer is taken into consideration. Details of the method of forming the uneven layer using a printing plate are described below.

In the case where an uneven layer is formed by coating, the particles contained in the coating liquid may not a little aggregate, and therefore various measures for preventing $Rz_{x11}/Ra_{x11}$ from increasing will be necessary, and such is unfavorable as complicating the coating process.

A thermosetting resin composition is a composition containing at least a thermosetting resin, and this is a resin composition that cures by heating. The thermosetting resin includes an acrylic resin, a urethane resin, a phenolic resin, a urea-melamine resin, an epoxy resin, an unsaturated polyester resin, and a silicone resin. In the thermosetting resin composition, if desired, a curing agent is added to such a curable resin.

An ionizing radiation-curable resin composition is a composition containing a compound having an ionizing radiation-curable functional group (hereinafter also referred to as "ionizing radiation-curable compound"). The ionizing radiation-curable functional group includes an ethylenic unsaturated bond group such as a (meth)acryloyl group, a vinyl group and an allyl group, and an epoxy group, and an oxetanyl group.

The ionizing radiation-curable resin is preferably a compound having an ethylenic unsaturated bond group. From the viewpoint of preventing the uneven layer from being scratched in a process of producing a transfer sheet, as the ionizing radiation-curable resin, a compound having two or more ethylenic unsaturated bond groups is preferred, and above all, a polyfunctional (meth)acrylate compound having two or more ethylenic unsaturated bond groups is more preferred. As the polyfunctional (meth)acrylate compound, any of a monomer and an oligomer is usable.

An ionizing radiation means one having an energy quantum capable of polymerizing or crosslinking molecules, among electromagnetic waves and charged particle radiations, and in general, ultraviolet ray (UV) or electron beam (EB) is used, and in addition, electromagnetic waves such as X ray and γ ray, and charged particle radiations such as a ray and ion beam are also usable.

Among polyfunctional (meth)acrylate compounds, a difunctional (meth)acrylate monomer includes ethylene glycol di(meth)acrylate, bisphenol A tetraethoxy diacrylate, bisphenol A tetrapropoxy diacrylate, and 1,6-hexanediol diacrylate.

Examples of a trifunctional or higher (meth)acrylate monomer include trimethylolpropane tri(meth)acrylate, pentaerythritol tri(meth)acrylate, pentaerythritol tetra(meth)

acrylate, dipentaerythritol hexa(meth)acrylate, dipentaerythritol tetra(meth)acrylate, and isocyanuric acid-modified tri(meth)acrylate.

A part of the molecular skeleton of the above-mentioned (meth)acrylate monomer may be modified, and those modified with any of ethylene oxide, propylene oxide, caprolactone, isocyanuric acid, alkyl, cyclic alkyl, aromatic or bisphenol are also usable.

The polyfunctional (meth)acrylate oligomer includes acrylate polymers such as urethane (meth)acrylate, epoxy (meth)acrylate, polyester (meth)acrylate, and polyether (meth)acrylate.

Urethane (meth)acrylate can be obtained by reaction of a polyalcohol and an organic diisocyanate and a hydroxy (meth)acrylate.

Preferred examples of epoxy (meth)acrylate include a (meth)acrylate obtained by reaction of a trifunctional or higher aromatic epoxy resin, an alicyclic epoxy resin, or an aliphatic epoxy resin and a (meth)acrylic acid; a (meth)acrylate obtained by reaction of a difunctional or higher aromatic epoxy resin, an alicyclic epoxy resin or an aliphatic epoxy resin and a polybasic acid and a (meth)acrylic acid, and a (meth)acrylate obtained by reaction of a difunctional or higher aromatic epoxy resin, an alicyclic epoxy resin or an aliphatic epoxy resin and a phenolic compound and a (meth)acrylic acid.

One alone or two or more kinds of the above-mentioned ionizing radiation-curable resins can be used either singly or as combined.

In the case where the ionizing radiation-curable resin is a UV-curable resin, preferably, the coating liquid for forming the uneven layer contains an additive such as a photopolymerization initiator or a photopolymerization accelerator.

The photopolymerization initiator includes one or more selected from acetophenone, benzophenone, α-hydroxyalkylphenone, Michler ketone, benzoin, benzyldimethyl ketal, benzoyl benzoate, α-acyloxime ester, and thioxanthones.

The photopolymerization accelerator can reduce polymerization inhibition by air in curing to thereby accelerate a curing rate, and examples thereof include one or more selected from isoamyl p-dimethylaminobenzoate, and ethyl p-dimethylaminobenzoate.

The thickness, after dried, of the uneven layer (hereinafter referred to as the thickness $T_1$ of the uneven layer) is, though not specifically limited, preferably 1 to 15 μm, more preferably 2 to 12 μm. The thickness $T_1$ of the uneven layer indicates the thickness from the bottom to the top of the uneven layer.

From the viewpoint of improving the releasability between the release sheet and the transfer layer, preferably, the uneven layer does not substantially contain particles. Specifically, the content of particles in the uneven layer is preferably less than 1% by mass, more preferably less than 0.1% by mass, even more preferably less than 0.01% by mass, further more preferably 0% by mass.

(First Release Layer)

The first release layer is a layer provided for the purpose of readily releasing the transfer layer from the substrate and the uneven layer and for the purpose of improving the contrast of the decorative molded article, and is formed on the above-mentioned region (P'). Accordingly, the surface profile of the first release layer is a profile that follows the uneven profile of the uneven layer, that is, an uneven profile.

The surface of the first release layer satisfies the above-mentioned requirement (1)', and therefore the protective layer of the decorative molded article to be produced using the transfer sheet of the present invention satisfies the above-mentioned requirement (1) and can prevent whitening.

The unevenness of the high-frequency component tends to make peeling heavier. Accordingly, satisfying the requirement (1)' facilitates peeling of the other layers (substrate, uneven layer, etc.) from the protective layer.

$(Ra_{x11}-Ra_{y11})/Ra_{y11}$ is, from the viewpoint that a suitable low-frequency component can prevent whitening and can better contrast, preferably 0.30 to 0.82, more preferably 0.30 to 0.78, even more preferably 0.30 to 0.74.

The uneven surface of the first release layer satisfying the requirement (2)', and therefore the protective layer of the decorative molded article to be produced using the transfer sheet of the present invention satisfies the above-mentioned requirement (2) and can prevent sparkle.

$Rz_{x11}/Ra_{x11}$ is preferably 14.0 or less, more preferably 13.0 or less, even more preferably 12.0 or less, further more preferably 10.0 or less.

The lower limit of $Rz_{x11}/Ra_{x11}$ is preferably 3.0 or more, more preferably 5.0 or more, even more preferably 6.0 or more, further more preferably 7.0 or more. When $Rz_{x11}/Ra_{x11}$ is 3.0 or more, the unevenness of the region (P') can be given certain randomness, and the defects in the region (P) after transfer can be made to be inconspicuous. In addition, since the defects are inconspicuous, the design decorativeness and the production yield of the decorative molded article can be prevented from lowering.

The uneven surface of the first release layer satisfies the requirement (3)', and therefore can give sufficient antiglare performance.

$Ra_{x11}$ is, from the viewpoint of attaining sufficient antiglare performance, preferably 0.14 to 0.22 μm, more preferably 0.15 to 0.21 μm, even more preferably 0.16 to 0.20 μm.

$Rz_{11}$ is preferably 0.25 to 5.00 μm, more preferably 0.50 to 2.50 μm, even more preferably 1.00 to 2.00 μm.

A ratio of the thickness $T_1$ of the uneven layer to the thickness $T_2$, after dried, of the first release layer (hereinafter referred to as the thickness $T_2$ of the first release layer) $(T_1/T_2)$ is preferably 0.2 to 200, more preferably 1.0 to 100, even more preferably 2.0 to 50, further more preferably 3.0 to 10. When the ratio is 0.2 or more, the unevenness of the low-frequency component can readily give antiglare performance, and when 200 or less, the decorative molded article can have increased contrast, can prevent sparkle and can enhance design decorativeness.

The thickness $T_1$ of the uneven layer and the thickness $T_2$ of the first release layer each can be calculated from an average value of data of 20 sites, by measuring the thickness of 20 sites on an image of a cross section taken using, for example, a scanning transmission electron microscope (STEM). The acceleration voltage for STEM is preferably 10 kV to 30 kV. The magnification of STEM is, in the case where the thickness to be measured is on an micron-order, preferably 1,000 to 7,000 times, and is, in the case where the thickness to be measured is on an nano-order, preferably 50,000 to 300,000 times.

The material of the first release layer is not specifically limited and may be any material having a low adhesion power to the protective layer and capable of readily releasing the transfer layer from the substrate. Examples thereof include a thermoplastic resin such as a fluororesin, an acrylic resin (for example, including an acryl-melamine resin), a polyester resin, a polyolefin resin, a polystyrene resin, a polyurethane resin, a cellulose resin, a vinyl chloride-vinyl acetate copolymer resin, and nitrocellulose, as well as a copolymer of a monomer to form such a thermoplastic resin, and one prepared by modifying such a resin with (meth) acrylic acid or urethane. The first release layer can be formed using one alone or a mixture resin of plural kinds of those resins either singly or as combined.

In the present invention, especially preferably, the release layer is formed using an ester group-containing curable resin. As the ester group-containing curable resin, an ionizing radiation-curable resin or a thermosetting resin can be used. The ionizing radiation-curable resin may be one having an ester group in the side chain, and includes an acryl (meth)acrylate, a urethane (meth)acrylate, an epoxy (meth) acrylate and polyether (meth)acrylate having an ester group in the side chain. The thermosetting resin may be a resin prepared by reacting a polymer having an ester group and a hydroxy group in the side chain and an isocyanate, and examples thereof include resins prepared by reacting an acrylic resin, an epoxy resin or a phenol resin having an ester group and a hydroxy group in the side chain, and an isocyanate. In particular, a resin prepared by reacting an acryl polyol and an isocyanate is preferably used.

The first release layer may further contain a release agent. The release agent includes waxes such a synthetic wax and a natural wax. The synthetic wax is preferably a polyolefin wax such as a polyethylene wax and a polypropylene wax. Containing a release agent, the first release layer can improve releasability.

Preferably, the first release layer does not contain a filler having an average particle size of 0.5 μm or more, more preferably a filler having an average particle size of 0.2 μm or more. Not containing a filler having an average particle size of of 0.5 μm or more, the high-frequency component in the unevenness on the first release layer can be reduced. Accordingly, the decorative molded article produced using the transfer sheet of the present invention can have, as formed on the surface thereof, an uneven profile of an uneven layer in which the unevenness of the high-frequency component has been relaxed by the first release layer (an uneven profile of the surface of the first release layer) and the contrast in the uneven profile part is thereby improved to improve the design decorativeness of the decorative molded article. In addition, the uneven profile part can be prevented from sparkle.

For the first release layer, a filler of less than 0.5 μm can be added to the coating liquid for imparting thixotropic performance thereto. However, from the viewpoint of reducing unevenness of the high-frequency component, preferably, the average particle size of the filler is less than 0.2 μm, and the content thereof is preferably 10 parts by mass or less relative to 100 parts by mass of the resin component.

The first release layer can be formed by coating and drying according to a gravure printing method, a screen printing method, a slit reverse method or a reverse coating method using a gravure printing plate, in which a first release layer-forming coating liquid containing a resin to constitute the first release layer and a suitable solvent is prepared and applied onto the uneven profile of the uneven layer.

The thickness $T_2$ of the first release layer is preferably 0.05 to 10 μm, more preferably 0.1 to 5 μm.

(Second Release Layer)

The second release layer is a layer provided for readily releasing the transfer layer from the substrate and the relaxation layer, and is provided on the region (Q') of the substrate.

In the present invention, the surface of the region (Q') of the uneven surface of the second release layer may be nearly smooth not having an uneven part, but may have an uneven part like the region (P').

In the present invention, in the surface of the region (Q') of the uneven surface of the second release layer, preferably, the arithmetic average roughness ($Ra_{x22}$) according to JIS B0601:1994 at a cutoff value of 0.8 mm satisfies the following requirement GO:

$$Ra_{x22} < Ra_{x11} \tag{4}'$$

When $Ra_{x11}$ and $Ra_{x22}$ satisfy the requirement (4)', the region (P') and the region (Q') can be thereby clearly differentiated to improve design decorativeness.

The difference between $Ra_{x11}$ and $Ra_{x22}$ ($Ra_{x11} - Ra_{x22}$) is, from the viewpoint of improving design decorativeness, preferably 0.05 to 1.00 μm, more preferably 0.07 to 0.80 μm, even more preferably 0.12 to 0.30 μm.

In addition, when the requirement (4)' is satisfied and when the requirement (2)' is satisfied, the difference between the peel strength of the region (P') and the peel strength of the region (Q') can be prevented from increasing to thereby prevent formation of streaky patterns in releasing the release sheet.

$Ra_{x22}$ is, from the viewpoint of clarifying differentiation from the region (P') and improving design decorativeness, preferably less than 0.10 μm, more preferably 0.07 μm or less, even more preferably 0.05 μm or less.

The material for the second release layer is not specifically limited so far as its adhesion power to the protective layer is low and it facilitates peeling of the transfer layer from the substrate, and for example, the second release layer can be formed using the resin exemplified in the section of the first release layer, and the material for the layer may be the same as or different from the resin composition for use for the first release layer.

Preferably, the second release layer does not contain a filler having an average particle size of 0.5 μm or more, and more preferably does not contain a filler having an average particle size of 0.2 μm or more. When the second release layer does not contain a filler having an average particle size of 0.5 μm or more, the surface smoothness of the second release layer increases and accordingly the surface smoothness of the protective layer provided on the second release layer can be thereby increased. As a result, when the transfer layer provided with the protective layer is transferred to an object to be transferred (resin molded article), a smooth surface of the protective layer can be formed on the surface of the resultant decorative molded article, and accordingly the article can express a texture different from the uneven profile formed by the uneven layer and the first release layer.

The second release layer may contain, as added thereto, a filler smaller than 0.5 μm for the purpose of imparting thixotropy to the coating liquid. However, from the viewpoint of reducing the unevenness of the high-frequency component, preferably, the average particle size of the filler is less than 0.2 μm, and the content thereof is preferably 10 parts by mass or less relative to 100 parts by mass of the resin component.

The second release layer can be formed by coating and drying according to a gravure printing method, a screen printing method, a slit reverse method or a reverse coating method using a gravure printing plate, in which a second release layer-forming coating liquid containing the above-mentioned resin and a suitable solvent is prepared and applied onto a substrate.

In the case where the region (Q') of the substrate does not have an uneven layer thereon, of where the region (Q') of the substrate has an uneven layer and a relaxation layer thereon, the thickness $T_3$ after dried of the second release layer (hereinunder referred to as a thickness $T_3$ of the second release layer) is preferably 0.05 to 10 μm, more preferably 0.1 to 5 μm. In the case where the region (Q') of the substrate has an uneven layer thereon but does not have a relaxation layer, the thickness $T_3$ of the second release layer is preferably 0.05 to 10 μm, more preferably 0.1 to 5 μm.

(Relaxation Layer)

In the case where an uneven layer is formed on the region (Q') of the substrate in the transfer sheet of the present invention, preferably, a relaxation layer is further provided between the uneven layer and the second release layer therein for the purpose of more smoothing the uneven profile of the uneven layer.

The relaxation layer may be formed of a resin such as a polyvinyl resin, a polyester resin, an acrylic resin, a polyvinyl acetal resin or a cellulose resin, or may be formed of a coloring ink that contains such a resin as a binder and a pigment or a dye of a suitable color as a colorant. When a relaxation layer contains a colorant, a marker for positioning in printing a pattern on a transfer layer or for positioning with an object to be transferred (resin molded article) can be formed simultaneously with forming the relaxation layer. In this case, color is not limited to a color visible to the human eye but includes a color detectable by machines such as IR ray. Above all, preferably, the relaxation layer is black from the viewpoint of being surely detectable irrespective of the type of the light source of phototubes. The printing method may be any known printing method of gravure printing, offset printing, silk screen printing, transfer printing, sublimation transfer printing, or inkjet printing. Without adding a coloring agent to the second release layer, a coloring agent may be added to a relaxation layer, and in such a case, unevenness is hardly formed to be caused by the coloring agent on the surface of the second layer and the releasability between the second release layer and the protective layer can be readily bettered.

The thickness of the relaxation layer is preferably 0.1 to 10 μm, more preferably 0.5 to 5 μm. The average particle size of the coloring agent is preferably 5 nm to 500 nm from the viewpoint of relaxing unevenness. Here, the average particle size is a 50% particle size (d50: median diameter), for which particles in a solution are measured according to a dynamic light scattering method and the particle size distribution is expressed as a volume cumulative distribution, and the 50% particle size can be measured using a Microtrac particle sizer (available from Nikkiso Co., Ltd.).

In the case where an uneven layer is formed on the region (Q') of the substrate, a ratio of the thickness of the uneven layer to the total thickness of the layers constituting the release sheet existing on the uneven layer [thickness of uneven layer/total thickness of layers constituting release sheet existing on uneven layer] is preferably 0.01 to 70, more preferably 0.1 to 15.

The transfer sheet of the present invention may further have, on the surface opposite to the substrate of the protective layer, functional layers such as an anchor layer, a print layer and an adhesive layer. The materials for the anchor layer, the print layer and the adhesive layer are described in the section of "decorative molded article".

[Production Method for Decorative Molded Article]

A production method for the decorative molded article of the present invention includes the following steps (1) and (2) to be carried out in that order.

(1) A step of preparing a laminate by airtightly adhering the surface on the protective layer side, based on a release sheet (substrate, uneven layer, first release layer, and second release layer), of the transfer sheet of the present invention mentioned above to an object to be transferred (resin molded article), and (2) A step of separating the release sheet of the transfer sheet from the laminate.

For the production method for a decorative molded article, a known transfer method is employable. For example, (i) a method of sticking a transfer sheet to a previously formed object to be transferred (resin molded article), transferring the transfer layer of the transfer sheet, and then releasing the release sheet of the transfer sheet, (ii) a method of sticking a transfer sheet to a tabular object to be transferred (resin molded article), transferring the transfer layer of the transfer sheet, then releasing the release sheet of the transfer sheet, and thereafter bending the laminate of the resin molded article laminated with the transfer layer, and (iii) a method of injection-molding an object to be transferred (resin molded article) while integrated with a transfer sheet, and thereafter releasing the release sheet of the transfer sheet [in-mold process (simultaneous injection-molding and transfer decoration method)]. Above all, according to the in-mold process (simultaneous injection-molding and transfer decoration method), a resin molded article having a complicated surface profile such as a three-dimensional curve surface profile can be produced in a mode of decorative molding operation.

One embodiment of the production method for the decorative molded article using the transfer sheet of the present invention according to an in-mold process includes the following steps:

(a) a step of arranging the transfer layer side of the transfer sheet toward the inside of the mold for in-mold molding, (b) a step of injecting a resin into the mold for in-mold molding, (c) a step of integrating the resin with the transfer sheet to thereby transfer the transfer layer of the transfer sheet onto the surface of the object to be transferred (resin molded article), (d) a step of taking out the transferred object (resin molded article) from the mold, and separating the release sheet of the transfer sheet.

By producing a decorative molded article according to the production process as above, a complicated design can be expressed on the surface of the resin molded article.

<Production Method for Release Sheet>

The release sheet having a region (P') and a region (Q') can be produced, for example, according to the following steps (A1) to (A2).

(A1) A step of applying an uneven layer-forming coating liquid that contains an ionizing radiation-curable resin composition onto a substrate to form an ionizing radiation-curable resin composition-containing layer.

(A2) A step of profiling an uncured uneven resin layer using a plate having a profile complementary to a region (P') and a region (Q'), and simultaneously irradiating the resin layer with an ionizing radiation to cure the formed uneven resin layer.

In the case where the ionizing radiation-curable resin composition contains a solvent, preferably, the solvent is removed by drying in the step (A1).

In the case where the release sheet has a release layer (first release layer, second release layer), a step (A3) of forming a release layer on the uneven layer is carried out after the step (A2).

In the case where the release sheet has any other region, a plate having a profile complementary to the region (P'), the region (Q') and the other region may be used as the plate in the step (A2).

The plate for use in the step (A2) can be prepared by engraving the surface of a cylinder to have a desired profile, for example, according to etching, sand blasting, cutting, laser processing or a combination of these. Also the plate can be prepared by first forming a long male plate (plate having the same profile as that of the region (P') and the region (Q')) according to laser engraving or photofabrication and then winding an inverted one thereof around the surface of a cylinder.

The surface of the plate for use in the step (A2) is preferably plated with nickel or chromium, and is more preferably processed for hard chromium plating.

Among the above-mentioned plate forming methods, sand blasting is preferred from the viewpoint that $Rz_{x11}/Ra_{x11}$, an index of randomness of unevenness can be readily controlled.

In sand blasting, for example, uneven profiles can be controlled, for example, by controlling the material of cylinder surface, the particle size of abrasive agent, the material of abrasive agent, the collision frequency of abrasive agent onto cylinder, the distance between jet nozzle and cylinder, the diameter of jet nozzle, the angle of jet nozzle to object to be worked, the jetting pressure and the jetting frequency. The frequency for approach to averaging the unevenness varies depending on the sand blasting conditions, and under the sand blasting conditions in Examples, preferably, sand blasting treatment is carried out for 3 to 8 times or so for one site of a cylinder surface.

Among the above-mentioned controlling means, "collision frequency of abrasive agent onto cylinder" is most simple and effective for controlling $Rz_{x11}/Ra_{x11}$. Specifically, when the number of collision times of an abrasive agent on a cylinder surface is small, $Rz_{x11}/Ra_{x11}$ tends to increase and $(Ra_{x11}-Ra_{y11})/Ra_{y11}$ that is a low-frequency proportion tends to decrease. With the increase in the number of collision times of an abrasive agent on a cylinder surface, $Rz_{x11}/Ra_{x11}$ tends to decrease and $(Ra_{x11}-Ra_{y11})/Ra_{y11}$ that is a low-frequency proportion tends to increase. However, though $Rz_{x11}/Ra_{x11}$ may be decreased by increasing the number of collision times, such is limitative, and the decrease in $Rz_{x11}/Ra_{x11}$ may be then gradually saturated.

When the material of the cylinder surface is hard, the cylinder could hardly be cut deep by the abrasive agent, and therefore in such a case, $Rz_{x11}/Ra_{x11}$ tends to decrease.

When the particle size of the abrasive agent is large, the surface unevenness can be averaged and $Rz_{x11}/Ra_{x11}$ tends to decrease. When the shape of the abrasive agent is spherical, specific unevenness is hardly formed so that the surface unevenness can be averaged and $Rz_{x11}/Ra_{x11}$ tends to decrease.

When the distance between a jet nozzle and a cylinder is reduced, both $Ra_{x11}$ and $Rz_{x11}$ tend to increase and the increase rate thereof is on the same level. Namely, even though the distance between a jet nozzle and a cylinder is varied, $Rz_{x11}/Ra_{x11}$ tends to show nearly the same value.

When a jetting pressure increases, both $Ra_{x11}$ and $Rz_{x11}$ tend to increase and the increase rate thereof is on the same level. Namely, even though the jetting pressure is varied, $Rz_{x11}/Ra_{x11}$ tends to show nearly the same value.

In the case where any other layer such as a release layer is formed on the uneven layer, the surface unevenness of the transfer sheet can be relaxed more than the surface unevenness of the uneven layer. Accordingly, in the case where any other layer is formed on the uneven layer, the plate to be used in the step (A2) may be such that relaxation of the surface unevenness is taken into consideration.

For example, in the case where a release layer having a thickness of 0.4 µm is formed on the uneven layer, Ra and Rz of the release layer surface may be around 60% of those of the protective layer surface, and in the case where a release layer having a thickness of 0.8 µm is formed on the uneven layer, Ra and Rz of the release layer surface may be around 50% of those of the uneven layer surface, and in the case where a release layer having a thickness of 1.3 µm is formed on the uneven layer, Ra and Rz of the release layer surface may be around 40% of those of the uneven layer surface. The above-mentioned proportions are rough indications, and may vary a little depending on the related conditions such as the viscosity of the release layer-forming coating liquid.

The decrease rate of Ra and Rz in forming any other layer on the uneven layer is nearly the same. Consequently, Rz/Ra in the uneven layer surface is nearly the same as Rz/Ra on the other layers. Accordingly, the value of $Rz_{x11}/Ra_{x11}$ can be almost controlled according to the profile of the printing plate used.

A release sheet having a region (P') and a region (Q') can also be produced, for example, according to the following steps (B1) to (B2).

(B1) A step of filling an uneven layer-forming coating liquid into a plate having a profile complementary to the region (P') and the region (Q').

(B2) A step of transferring the uneven layer-forming coating liquid filled in the plate onto a substrate and optionally drying and curing it to form an uneven layer.

From the viewpoint of forming a correct and accurate profile, the above-mentioned steps (A1) to (A2) are preferred.

[Display Device]

The display device of the present invention has the above-mentioned decorative molded article on the front surface of a display element such as a liquid crystal display element.

The display element includes a liquid-crystal display element, an EL display element, a plasma display element, and an electronic paper element.

The display device of the present invention can prevent whitening and sparkle.

EXAMPLES

The present invention is described specifically with reference to Examples and Comparative Examples given hereinunder. However, the present invention is not restricted to the embodiments of those Examples.

1. Production of Printing Plate 1-1. Production of Printing Plate A

A cylinder having, on the surface thereof, a metal layer of hard copper having a thickness of 200 µm was prepared. Next, a part thereof except an area to be processed was masked. Next, while the cylinder was rotated, the surface of the unmasked area of the cylinder was repeatedly sand-blasted under the following conditions until the surface unevenness could be averaged, thereby producing a printing plate A having, as arranged therein, a region (P') in the central part thereof and a region (Q') in the peripheral part.

[Sand Blasting Condition]
Diameter of cylinder: 300 mm
Abrasive grains: glass beads having a mean grain size of 83 µm
Diameter of jetting nozzle: 9 mm
Angle of jetting nozzle to object to be processed: vertical
Distance between jetting nozzle and object to be processed: 400 mm
Jetting pressure: 0.20 MPa
Pump frequency: 90 Hz 1-2. Production of Printing Plates B to D Printing plates B to D were produced in the same manner as that for the printing plate A except that the sand blasting conditions and the metal layer of the cylinder were changed as in Table 1.

TABLE 1

|  | Metal Layer | | Sand-Blasting Conditions | |
|---|---|---|---|---|
|  | Material | Thickness (µm) | Kind of Abrasive Grains | Grain Size of Abrasive Grains (µm) | Jetting Pressure (MPa) |
| Plate A | hard copper | 200 | glass beads | 83 | 0.23 |
| Plate B | hard copper | 200 | glass beads | 83 | 0.26 |
| Plate C | stainless steel | 200 | glass beads | 83 | 0.20 |
| Plate D | hard copper | 200 | glass beads | 90 | 0.16 |

2. Production of Transfer Sheet

Example 1

On the primer-treated surface of a polyethylene terephthalate film (substrate) having a thickness of 50 µm, an uneven layer-forming coting liquid of the following formulation was applied and dried to form an uncured layer.

| <Uneven layer-forming coating liquid> | |
|---|---|
| Urethane acrylate | 60 parts by mass |
| Methyl ethyl ketone | 40 parts by mass |
| Silicone-based leveling agent | 0.5 parts by mass |

Next, using the plate A produced in the above "1", the uncured layer was formed and simultaneously irradiated with an ionizing radiation from the polyethylene terephthalate film side to cure the formed uneven layer, thereby forming an uneven layer on the polyethylene terephthalate film. The thickness after dried of the uneven layer, T1, was measured according to the method described in this description, and was 5.0 µm.

Next, a release layer-forming coating liquid of the following formulation was applied entirely on the uneven layer, then dried and cured to form a release layer, thereby giving a release sheet for use in Example 1. The release sheet was so configured that a region (P') was arranged in the center part thereof and a region (Q') was in the peripheral part. The thickness of the first release layer on the region (P') was measured according to the method described in this description, and was 0.3 µm.

| <Release layer-forming coating liquid> | |
|---|---|
| Acryl polyol | 70 parts by mass |
| Isocyanate | 25 parts by mass |
| Ethyl acetate | 161 parts by mass |
| Methyl isobutyl ketone | 56 parts by mass |

Next, on the release layer of the release sheet, a protective layer-forming coating liquid of the following formulation was applied so that the deposited amount thereof after dried could be 6.5 g/m² (6.0 µm) to form a coating layer, and then irradiated with a fusion UV lamp system at a transportation velocity of 20 m/min and under the condition of an output 40% to semicure the protective layer. The cumulative light quantity at this time was measured with an illuminometer available from Eye Graphics Co., Ltd. (trade name: UVPF-A1) and was 15 mJ/m².

| <Protective layer-forming coating liquid> | |
|---|---|
| Urethane acrylate-based UV-curable resin composition (solid content: 35% by mass, toluene/ethyl acetate mixed solvent) | 100 parts by mass |

Next, an anchor layer-forming coating liquid of the following formulation was applied onto the protective layer so that the deposited amount thereof after dried could be 3.0 g/m², and dried to form a coating layer, and then aged at 40° C. for 72 hours to cure it to form an anchor layer having a thickness of 2 µm.

| <Anchor layer-forming coating liquid> | |
|---|---|
| Acryl polyol (solid content: 25% by mass) (toluene/ethyl acetate/methyl ethyl ketone mixed solvent) | 100 parts by mass |
| xane methylene diisocyanate (solid content: 75% by mass, solvent: ethyl acetate) | 10 parts by mass |

Next, on the anchor layer, an adhesive layer-forming coating liquid of the following formulation was applied so that the deposited amount thereof after dried could be 2.5 g/m² to form a coating layer. The coating layer was dried to be an adhesive layer having a thickness of 2 µm, thereby giving a transfer sheet of Example 1.

| <Adhesive layer-forming coating liquid> | |
|---|---|
| Acrylic resin (solid content: 20%) (ethyl acetate/n-propyl acetate/methyl ethyl ketone mixed solvent) | 100 parts by mass |
| Methyl ethyl ketone | 40 parts by mass |

On a transparent acrylic sheet of an object to be transferred (resin molded article) (available from Kuraray Co., Ltd., trade name: Comoglas DK3, thickness 2 mm), the transfer layer was put in such a manner that the surface of the adhesive layer side could face the adherend side, and pressed under heat from the support side of the transfer sheet to thereby airtightly adhere the object to be transferred to the transfer sheet and thus the two were laminated. Next, the release sheet of the transfer sheet was released (peeled) from the laminate, and then UV-irradiated (in air, H bulb, 800 mJ/cm$^2$) to completely cure the protective layer, thereby giving a decorative molded article of Example 1.

Examples 2 to 6, Comparative Example 1

Transfer sheets of Examples 2 to 6 and a transfer sheet of Comparative Example 1 were produced in the same manner as in Example 1 except that the plate and the thickness of the first release layer were changed as in Table 2. In addition, decorative molded articles of Examples 2 to 6 were produced in the same manner as in Example 1 except that the transfer sheet of Example 1 was changed to any of the transfer sheets of Examples 2 to 6 or Comparative Example 1.

Comparative Example 2

On a polyethylene terephthalate film (substrate) having a thickness of 50 μm, a matt layer-forming coating liquid of the following formulation was applied so that the thickness thereof after dried could be 2.5 μm to form a coating layer, and then, a smooth release film having an opening corresponding to a region P was stuck to the coating layer. While the release film was kept stuck, this was aged at room temperature (25° C.) for 72 hours to give a laminate A having a pre-cured matt layer. The laminate A was aged at 40° C. for 96 hours so that the matt layer was completely cured, and then the release film was peeled to give a transfer sheet of Comparative Example 2. The surface of the transfer sheet has an uneven region (P') and a nearly smooth region (Q') surrounding the region (P').

Next, in the same manner as in Example 1 except that the transfer sheet of Example 1 was changed to the transfer sheet of Comparative Example 2, a decorative molded article of Comparative Example 2 was produced.

| <Matt layer-forming coating liquid> | |
|---|---|
| Acryl polyol (solid content: 50% by mass) | 40 parts by mass |
| Filler (melamine-formaldehyde condensate particles, average particle size: 1.2 μm) | 4 parts by mass |
| Isocyanate (solid content: 75%) | 14 parts by mass |
| Ethyl acetate | 40 parts by mass |

Comparative Example 3

The release film of the laminate A produced in Comparative Example 2 was peeled, and onto the peeled surface, the release layer coating liquid of the above-mentioned formulation was applied so as to have a thickness after dried of 0.5 μm, and then this was aged and cured at 40° C. for 96 hours, the pre-cured matt layer was thus completely cured, and a release layer was formed to give a release sheet for use in Comparative Example 3.

Next, in the same manner as in Example 1 except that the release sheet of Example 1 was changed to the release sheet of Comparative Example 3, a transfer sheet and a decorative molded article of Comparative Example 3 were produced.
3. Measurement, Evaluation The decorative molded articles obtained in Examples and Comparative Examples were evaluated and measured as follows. The results are shown in Table 1.

3-1. Measurement of Surface Profile
3-1-1. Measurement at Cutoff Value 0.8 mm

Using a surface roughness meter (Model: SE-3400, available from Kosaka Laboratory Ltd.), the surface of the region (P) of the protective layer (the part corresponding to the region (P') of the transfer sheet) of the decorative molded article produced in Examples and Comparative Examples was analyzed under the measurement conditions mentioned below to measure $Ra_{x1}$ and $Rz_{x1}$ based on JIS B0601:1994. Similarly, the surface of the region (Q) (the part corresponding to the region (Q') of the transfer sheet) was analyzed to measure $Ra_{x2}$ based on JIS B0601:1994.
[Probe of Surface Roughness Detector]
SE2555N, trade name by Kosaka Laboratory Ltd. (apical curvature radius: 2 μm, apex angle: 90 degrees, material: diamond)
[Measurement Conditions for Surface Roughness Meter]
Reference length (cutoff value for roughness curve λc): 0.8 mm
Evaluation length (reference length (cutoff value λc)×5): 4.0 mm
Probe feed speed: 0.5 mm/s
Preliminary length: (cutoff value λc)×2
Longitudinal magnification: 2000 times
Lateral magnification: 10 times
3-1-2. Measurement at Cutoff Value 0.08 mm Using a surface roughness meter (Model: SE-3400, available from Kosaka Laboratory Ltd.), the surface of the region (P) of the protective layer (the part corresponding to the region (P') of the transfer sheet) of the decorative molded article produced in Examples and Comparative Examples was analyzed under the measurement conditions mentioned below to measure $Ra_{y1}$ based on JIS B0601:1994.
[Probe of Surface Roughness Detector]
SE2555N, trade name by Kosaka Laboratory Ltd. (apical curvature radius: 2 μm, apex angle: 90 degrees, material: diamond)
[Measurement Conditions for Surface Roughness Meter]
Reference length (cutoff value for roughness curve λc): 0.08 mm
Evaluation length (reference length (cutoff value λc)×5): 0.4 mm
Probe feed speed: 0.5 mm/s
Preliminary length: (cutoff value λc)×2
Longitudinal magnification: 2000 times
Lateral magnification: 10 times
3-1-3. Value Calculated from Measured Value Based on the measured value of the surface profile as above, $(Ra_{x1}-Ra_{y1})/Ra_{y1}$ and $Rz_{x1}/Ra_{x1}$ were calculated.
3-2. Sparkle The surface on the transparent acrylic sheet side of the decorative molded article obtained in Examples and Comparative Examples was stuck to the screen of a liquid crystal display device, and the region (P) and the region (Q) of the screen of the display device were visually observed from the front. The samples not having any minor brightness fluctuation at all in the screen image were given 3 points: those having little fluctuation in fine brightness were given 2 points; and those having a definite fluctuation in fine brightness were given 1 point. 20 exam monitors evaluated all the samples in that manner, and an average point was calculated.
<Evaluation Standard>
A: The average point was 2.5 or more.
B: The average point was 1.5 or more and less than 2.5.
C: The average point was less than 1.5.
3-5. Design Decorativeness The surface on the transparent acrylic sheet side of the decorative molded article obtained in Examples and Comparative Examples was stuck to the screen of a liquid crystal display device, and the region (P) and the region (Q) of the screen of the display device were visually observed. The samples having an extremely good contrast between the region (P) and the region (Q) were given 3 points; those having a good contrast between the region (P) and the region (Q) were given 2 points; and those having a bad contrast between the region (P) and the region (Q) were given 1 point. 20 exam monitors evaluated all the samples in that manner, and an average point was calculated.

<Evaluation Standard>
A: The average point was 2.5 or more.
B: The average point was 1.5 or more and less than 2.5.
C: The average point was less than 1.5.

3-4. Contrast

The surface on the transparent acrylic sheet side of the decorative molded article obtained in Examples and Comparative Examples was stuck to the printed surface of a black acrylic resin plate printed with an image. In a light room with a fluorescent lamp kept put on, the uneven part on the region (P) of the protective layer of the decorative molded article was visually observed. The samples having an extremely good contrast between the black background and the image were given 3 points; those having a good contrast between the black background and the image were given 2 points; and those having a bad contrast between the black background and the image were given 1 point. 20 exam monitors evaluated all the samples in that manner, and an average point was calculated.

<Evaluation Standard>
A: The average point was 2.5 or more.
B: The average point was 1.5 or more and less than 2.5.
C: The average point was less than 1.5.

3-5. Antiglare Performance

The region (P) of the protective layer of the decorative molded article obtained in Examples and Comparative Examples was visually observed from the protective layer side. The samples not having too strong regular reflection from the region (P) were given 3 points: those having somewhat strong regular reflection from the region (P) were given 2 points; and those having extremely strong regular reflection from the region (P) were given 1 point. 20 exam monitors evaluated all the samples in that manner, and an average point was calculated.

<Evaluation Standard>
○: The average point was 2.5 or more.
Δ: The average point was 1.5 or more and less than 2.5.
x: The average point was less than 1.5.

The results in Table 1 confirm that the transfer sheets of Examples 1 to 6 satisfying the requirements (1) to (3) prevent sparkle, have a high contrast and are excellent in antiglare performance and design decorativeness. In addition, it is also confirmed that the decorative molded articles obtained using the transfer sheets of Comparative Examples 1 to 6 have good appearance and can better design decorativeness and production yield when the transfer layer is transferred onto an object to be transferred using the transfer sheets.

INDUSTRIAL APPLICABILITY

The decorative molded article of the present invention can be favorably used in the field of communication devices such as mobile phones, in-car information devices, home electric appliances, etc. In particular, the decorative molded article of the present invention exhibits a good contrast and can prevent surface sparkle, and therefore can be favorably used for displays for communication devices such as mobile phones, in-car information devices, etc.

REFERENCE SIGNS LIST 10, 20, 30 Decorative Molded Article
40, 50, 60 Transfer Sheet
1, 11, 21 Resin Molded Article
2, 12, 22, 35, 45, 55 Protective Layer
13, 23, 47, 57 Anchor Layer
14, 24, 48, 58 Print Layer
15, 25, 49, 59 Adhesive Layer
31, 41, 51 Substrate
32, 42, 52 Uneven Layer
33, 43, 53 First Release Layer
34, 44, 54 Second Release Layer
46, 56 Relaxation Layer
P Region (P) of Protective Layer
Q Region (Q) of Protective Layer
P' Region (P') of Substrate
Q' Region (Q') of Substrate
X Release Sheet
Y Transfer Layer

The invention claimed is:

1. A decorative molded article provided with a protective layer on a resin molded article, wherein:
the protective layer has a region (P) having unevenness, and a region (Q) adjacent to the region (P),

TABLE 2

| | First Release Layer | Surface Profile | | | | | | Evaluation | | | |
|---|---|---|---|---|---|---|---|---|---|---|---|
| | thickness (μm) | $Ra_{x1}$ (μm) | $Ra_{x2}$ (μm) | $Ra_{y1}$ (μm) | $Rz_{x1}$ (μm) | $Rz_{x1}/Ra_{x1}$ | $(Ra_{x1} - Ra_{y1})/Ra_{y1}$ | Sparkle | Design Decorativeness | Contrast | Antiglare Performance |
| Example 1 | Plate A | 0.3 | 0.17 | 0.05 | 0.13 | 1.93 | 11.61 | 0.32 | B | A | A | A |
| Example 2 | Plate A | 0.5 | 0.19 | 0.05 | 0.14 | 1.84 | 9.64 | 0.38 | A | A | A | A |
| Example 3 | Plate A | 0.7 | 0.19 | 0.05 | 0.13 | 1.58 | 8.45 | 0.40 | A | A | A | A |
| Example 4 | Plate B | 0.7 | 0.20 | 0.05 | 0.13 | 1.81 | 9.17 | 0.48 | A | A | A | A |
| Example 5 | Plate B | 0.9 | 0.19 | 0.05 | 0.14 | 1.67 | 8.78 | 0.38 | A | A | A | A |
| Example 6 | Plate C | 0.5 | 0.15 | 0.05 | 0.09 | 1.21 | 7.85 | 0.73 | A | A | A | B |
| Comparative Example 1 | Plate D | 0.3 | 0.12 | 0.05 | 0.10 | 1.06 | 8.80 | 0.23 | A | C | C | C |
| Comparative Example 2 | — | — | 0.25 | 0.05 | 0.18 | 5.01 | 20.19 | 0.40 | C | A | B | A |
| Comparative Example 3 | — | — | 0.14 | 0.05 | 0.09 | 2.96 | 21.94 | 0.55 | C | B | A | A | in the surface of the region (P) of the protective layer, the arithmetic average roughness ($Ra_{x1}$) according to JIS B0601:1994 at a cutoff value of 0.8 mm, the arithmetic average roughness ($Ra_{y1}$) according to JIS B0601:1994 at a cutoff value of 0.08 mm, and the ten-point average roughness ($Rz_{x1}$) according to JIS B0601:1994 at a cutoff value of 0.8 mm satisfy the following requirements (1) to (3):

$$0.30 \leq (Ra_{x1} - Ra_{y1})/Ra_{y1} \leq 0.85 \quad (1)$$

$$Rz_{x1}/Ra_{x1} \leq 15.0 \quad (2)$$

$$Ra_{x1} \geq 0.14 \ \mu m \quad (3).$$

2. The decorative molded article according to claim 1, wherein in the surface of the region (Q) of the protective layer, the arithmetic average roughness ($Ra_{x2}$) according to JIS B0601:1994 at a cutoff value of 0.8 mm satisfies the following requirement (4):

$$Ra_{x2} < Ra_{x1} \quad (4).$$

3. A transfer sheet having:
a substrate having a region (P') and a region (Q') adjacent to the region (P'),
an uneven layer having an uneven profile provided on the region (P') of the substrate,
a first release layer formed on the uneven profile of the uneven layer,
a second release layer provided on the region (Q') of the substrate, and
a protective layer formed on the first release layer and the second release layer, wherein:
in the surface of the first release layer, the arithmetic average roughness ($Ra_{x11}$) according to JIS B0601: 1994 at a cutoff value of 0.8 mm, the arithmetic average roughness ($Ra_{y11}$) according to JIS B0601:1994 at a cutoff value of 0.08 mm, and the ten-point average roughness ($Rz_{x11}$) according to JIS B0601:1994 at a cutoff value of 0.8 mm satisfy the following requirements (1)' to (3)':

$$0.30 \leq (Ra_{x11} - Ra_{y11})/Ra_{y11} \leq 0.85 \quad (1)'$$

$$Rz_{x11}/Ra_{x11} \leq 15.0 \quad (2)'$$

$$Ra_{x11} \geq 0.14 \ \mu m \quad (3)'.$$

4. The transfer sheet according to claim 3, wherein in the surface of the second release layer, the arithmetic average roughness ($Ra_{x22}$) according to JIS B0601:1994 at a cutoff value of 0.8 mm satisfies the following requirement (4)':

$$Ra_{x22} < Ra_{x11} \quad (4)'.$$

5. A method for producing a decorative molded article, comprising:
a step of transferring the protective layer of the transfer sheet of claim 3 onto a resin molded article, and
a step of releasing the first release layer and the second release layer of the transfer sheet.

6. A display device having a decorative molded article of claim 1 on the front surface of a display element.

* * * * *